J. C. LAUTENBACHER & A. GEARY.
ANTISKIDDING OR EMERGENCY BRAKE FOR AUTOMOBILES.
APPLICATION FILED AUG. 21, 1913.
1,102,932.                              Patented July 7, 1914.
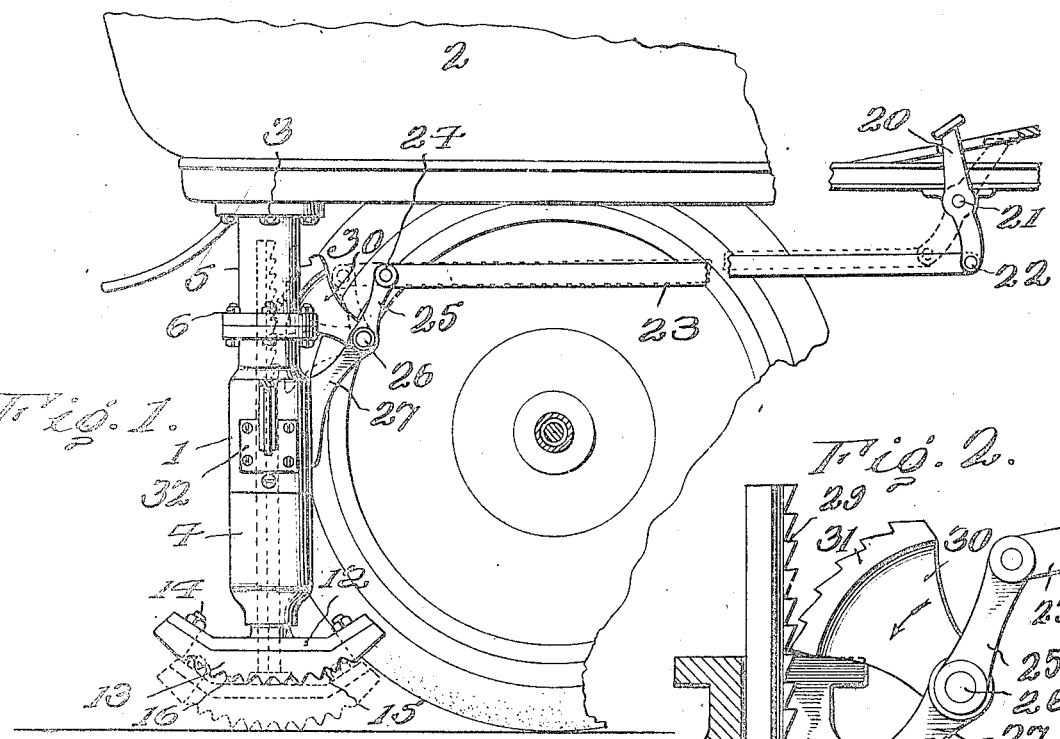
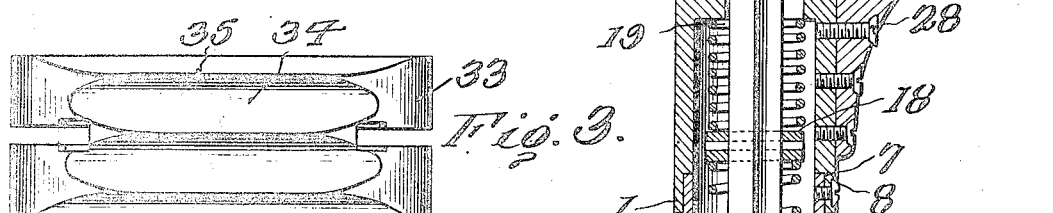
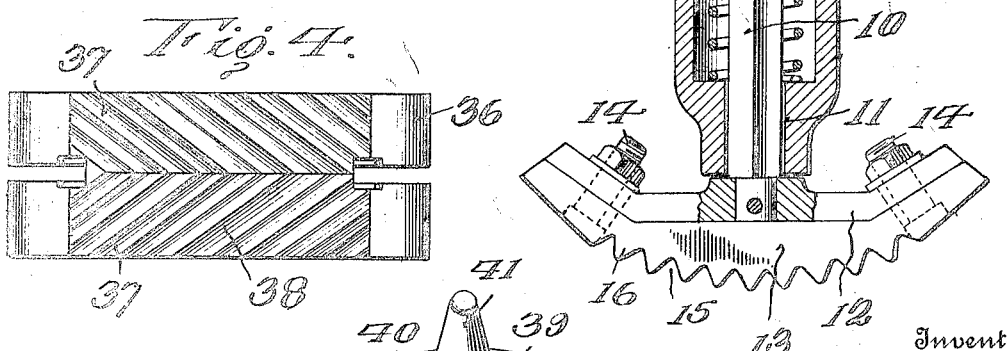
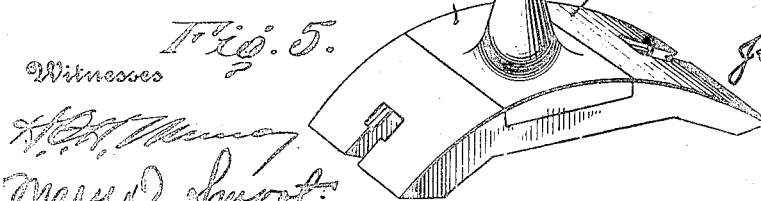
Inventors
Jeremiah C. Lautenbacher
Albert Geary
By Sturtevant & Mason
Attorneys
Witnesses

UNITED STATES PATENT OFFICE.

JEREMIAH C. LAUTENBACHER AND ALBERT GEARY, OF SCHUYLKILL HAVEN, PENNSYLVANIA.

ANTISKIDDING OR EMERGENCY BRAKE FOR AUTOMOBILES.

1,102,932. Specification of Letters Patent. Patented July 7, 1914.

Application filed August 21, 1913. Serial No. 785,972.

*To all whom it may concern:*

Be it known that we, JEREMIAH C. LAUTENBACHER and ALBERT GEARY, citizens of the United States, residing at Schuylkill Haven, in the county of Schuylkill, State of Pennsylvania, have invented certain new and useful Improvements in Antiskidding or Emergency Brakes for Automobiles, of which the following is a description, reference being had to the accompanying drawing and to the figures of reference marked thereon.

The invention relates to new and useful improvements in anti-skidding devices or emergency brakes for automobiles, and more particularly to devices of this character which may be manually controlled by a foot lever whenever desired.

An object of the invention is to provide an anti-skidding device or emergency brake which may be forced into contact with the road surface positively by a foot lever at will.

A further object of the invention is to provide devices of the above character wherein the brake shoe is automatically raised from contact with the road surface when released from the foot of the operator.

A still further object of the invention is to provide an anti-skidding device with a brake shoe which may be readily removed for the substitution of another brake shoe having a different tread when desired.

These and other objects will in part be obvious and will in part hereinafter be more fully disclosed.

In the drawings, which show by way of illustration one embodiment of the invention: Figure 1 is a side elevation of an anti-skidding device embodying my improvements showing the relation of the same to the automobile and the manner of supporting said anti-skidding device. Fig. 2 is a vertical sectional view through the anti-skidding device on an enlarged scale. Fig. 3 is a bottom plan view showing a different form of brake shoe. Fig. 4 is a bottom plan view showing another form of brake shoe. Fig. 5 is a perspective view showing a still different form of shoe which may be used in connection with my improved anti-skidding device.

The invention consists generally in providing a supporting frame or casing which is rigidly attached to the body portion of the automobile and projects downwardly therefrom. There may be a supporting frame or casing at each side of the automobile and within each frame or casing is a reciprocating supporting bar which carries the brake shoe. This bar is raised by a spring so as to normally hold the brake shoe raised from contact with the road surface. The rod is depressed to bring the brake shoe into operation by means of a segment rack which is operated through a link connection with a foot lever.

Referring more in detail to the drawings, our improved anti-skidding device or emergency brake consists of a supporting frame or casing 1 which is rigidly attached to the body 2 of the automobile by suitable bolts 3. This frame or casing 1 is formed in two sections, that is a main section 4 and an auxiliary supporting section 5. These two sections are secured together by bolts 6 which pass through flanges formed on the respective sections. The main section 4 is again divided into two parts to facilitate the assembling of the members and to afford a proper housing for the springs used in connection with the anti-skidding device to be hereinafter more fully described. The lower part of the main casing is formed so as to seat within the upper part, as at 7, and the two parts are secured together by screws 8. This main casing is bored so as to form a chamber 9. A rod passes through the main casing into the auxiliary casing, as clearly shown in Fig. 1. Said main casing is formed with an opening 11 leading from the chamber 9. This opening is smaller than the cross sectional area of the chamber and is preferably formed with flat faces which may be of any desired number, and the rod 10 is provided with similar faces which are so proportioned as to prevent the rod from turning in the casing.

The rod 10 is provided with a head 12 at its lower end which may be secured thereon in any suitable way. This head is formed with forwardly and rearwardly projecting portions, each of which is formed with a slot. The brake shoe 13 is made to conform to the supporting head 12 and is clamped thereto by bolts 14 which pass through the slots in the supporting head. The ends of the brake shoes are also preferably slotted to facilitate the ready insertion of the bolts. The brake shoe 13, as shown in Fig. 2, is curved substantially on the arc of a circle lengthwise thereof and is substantially straight transversely thereof. This brake shoe, as shown in this figure is also formed with transverse grooves 15 which form projecting ribs 16 extending transversely of the shoe.

Located within the chamber 9 is a spring 17 which rests on the shoulder formed at the lower end of the chamber and which bears against a collar 18 fixedly attached to the rod 10. This spring normally holds the brake shoe raised from operative engagement with the surface of the road. We have also shown, Fig. 2 of the drawing, a second spring 19, which engages the upper face of the collar 18 and rests against the upper wall of the chamber 9. The tension of the spring 19 is considerably less than the tension of the spring 17, so that the spring 17 will overcome the force of the spring 19 and raise the brake shoe, as above noted. This spring 19 is in the sense a cushion spring and cushions the rebound of the brake shoe and the parts moving therewith when released by the foot of the operator.

The brake shoe is depressed in contact with the road surface by a foot lever 20. This foot lever is pivoted at 21 to a suitable supporting bracket and extends to a point where it may be readily accessible for operation. The lower end of the foot lever is pivoted at 22 to a link 23 which is in turn pivoted at 24 to an arm 25 rigidly carried by a shaft 26 mounted in a bracket 27 which is secured to the main casing of the anti-skidding device by suitable screws 28. The upper end of the rod 10 is formed with a rack 29, the teeth of which preferably face slightly upward. The shaft 26 carries a segment rack 30 provided with teeth 31 which engage the teeth 29 of the rack on the rod 10. When the segment 30 is moved in the direction of the arrow shown in Fig. 2, the rod 10 will be moved downward in the casing compressing the spring 17 and this downward movement of the rod 10 brings the brake shoe or anti-skidding shoe into contact with the surface of the road.

As above noted, there may be an anti-skidding device at each side of the automobile body and these anti-skidding devices are preferably located inside of the wheels. The shaft 26 may extend from one supporting frame or casing to the other so that a single link 23 may be used for operating both anti-skidding devices. When the foot lever 20 is depressed to the dotted line position shown in Fig. 1, the brake shoes will be brought into contact with the road surface positively, as said foot lever is positively connected by a direct train of elements with the brake shoes. When the foot lever is released, said brake shoes will be automatically shifted to raised position by the springs 17. As further means for rigidly holding the supporting frame or casing, we have provided a side bracket 32 which is screwed to the casing and also fastened to the body of the automobile.

The brake shoe, shown in Figs. 1 and 2, is readily detachable from the supporting head and other brake shoes may, therefore, be readily substituted therefor. In Fig. 3 of the drawing, we have shown a brake shoe 33 having a different form of tread. This brake shoe is provided with longitudinally extending grooves 34 which form longitudinally extending ribs 35. In Fig. 4 of the drawing, we show a brake shoe 36 wherein the lower surface thereof is divided longitudinally between the side faces thereof and each side face is formed with grooves 37 which extend in different directions or at an angle to each other, thus forming ribs which are substantially V-shaped with the vertex of the V at the center of the shoe and projecting in a forward direction.

Fig. 5 of the drawing shows a brake shoe 39 which is recessed so as to receive the shank 40 of a projecting stud 41. This brake shoe is especially useful to prevent skidding when traveling on ice or loose road surfaces as the stud 41 will penetrate deeply into the surface.

It is obvious that minor changes in the details of construction and the arrangement of parts may be made without departing from the spirit of the invention as set forth in the appended claims.

Having thus described the invention what we claim as new is:—

1. An anti-skidding or emergency brake for automobiles including in combination a supporting casing, a rod adapted to reciprocate vertically in said casing, a brake shoe fixed to said rod, said casing having means for holding said rod from rotating in the casing, a spring located in said casing and normally holding said rod raised, a swinging member extending into said casing and directly connected with said rod for reciprocating the same, and means for operating said swinging member to positively force the brake shoe into contact with the road surface.

2. An anti-skidding or emergency brake for automobiles including in combination, a supporting frame, a rod adapted to reciprocate vertically in said supporting frame, a brake shoe fixed to said rod, a spring for normally holding said rod raised, said rod having a rack formed thereon, a segmental rack adapted to engage the rack on the rod carrying the brake shoe, a foot lever, and means for positively connecting said foot lever to the segmental rack.

3. An anti-skidding or emergency brake for automobiles, including in combination, a supporting frame, a rod adapted to reciprocate vertically in said supporting frame, a brake shoe fixed to said rod, a spring for normally holding said rod raised, said rod having a rack formed thereon, a segmental rack adapted to engage the rack on the rod carrying the brake shoe, a foot lever, means for positively connecting said foot lever to the segmental rack, and a spring for cushioning the upward movement of the brake shoe.

In testimony whereof, we affix our signatures in the presence of two witnesses.

JEREMIAH C. LAUTENBACHER.
ALBERT GEARY.

Witnesses:
MILTON MECK,
C. A. MOYER.